US012667518B2

(12) United States Patent
Zang

(10) Patent No.: US 12,667,518 B2
(45) Date of Patent: Jun. 30, 2026

(54) FASCIA GUN

(71) Applicant: ZHEJIANG AERLANG TECHNOLOGY CO., LTD., Jinhua (CN)

(72) Inventor: Chuanmei Zang, Jinhua (CN)

(73) Assignee: ZHEJIANG AERLANG TECHNOLOGY CO., LTD., Jinhua (CN)

( * ) Notice: Subject to any disclaimer, the term of this patent is extended or adjusted under 35 U.S.C. 154(b) by 1199 days.

(21) Appl. No.: 17/628,698

(22) PCT Filed: Jan. 13, 2021

(86) PCT No.: PCT/CN2021/071559
§ 371 (c)(1),
(2) Date: Jan. 20, 2022

(87) PCT Pub. No.: WO2021/143734
PCT Pub. Date: Jul. 22, 2021

(65) Prior Publication Data

US 2022/0331199 A1 Oct. 20, 2022

(30) Foreign Application Priority Data

Jan. 15, 2020 (CN) ........................ 202010044266.1

(51) Int. Cl.
*A61H 23/00* (2006.01)
*A61H 23/02* (2006.01)

(52) U.S. Cl.
CPC ....... *A61H 23/006* (2013.01); *A61H 23/0254* (2013.01); *A61H 2201/0153* (2013.01);
(Continued)

(58) Field of Classification Search
CPC .......................... A61H 23/006; A61H 23/0254
See application file for complete search history.

(56) References Cited

U.S. PATENT DOCUMENTS 10,314,762 B1 6/2019 Marton et al.
2006/0293711 A1 12/2006 Keller et al.
2018/0296433 A1* 10/2018 Danby .............. A61H 23/0254

FOREIGN PATENT DOCUMENTS

CN 104905953 A 9/2015
CN 108354825 A 8/2018
(Continued)

OTHER PUBLICATIONS

Extended European Search Report for European Application No. 21741054.7, dated Jan. 2, 2024.

*Primary Examiner* — LaToya M Louis
(74) *Attorney, Agent, or Firm* — Birch, Stewart, Kolasch & Birch, LLP

(57) ABSTRACT

Disclosed is a fascia gun (1), comprising a shell, a massage head (13), a transmission mechanism (15), a driving device (17) and a control device (18), wherein the control device (18) is connected to the driving device (17); the driving device (17) is connected to the transmission mechanism (17); the transmission mechanism (15) is connected to the massage head (13); the driving device (17), the transmission mechanism (15) and the control device (18) are all mounted in the shell; and the control device (18) comprises a wireless transmission module to be wirelessly connected to an upper computer. Compared with mechanical switch control, a wireless transmission function is provided, such that the vibration frequency of the fascia gun (1) can be wirelessly controlled, thus greatly improving the ease of use of the fascia gun (1).

13 Claims, 4 Drawing Sheets

(52) U.S. Cl.
CPC .................. *A61H 2201/149* (2013.01); *A61H 2201/5048* (2013.01); *A61H 2201/5097* (2013.01)

(56) References Cited

FOREIGN PATENT DOCUMENTS

| | | | |
|---|---|---|---|
| CN | 208785236 | U | 4/2019 |
| CN | 109907965 | A | 6/2019 |
| CN | 209519089 | U | 10/2019 |
| CN | 209695766 | U | 11/2019 |
| CN | 110680711 | A | 1/2020 |
| CN | 110960412 | A | 4/2020 |
| CN | 212490710 | U | 2/2021 |
| TW | M588531 | U | 1/2020 |

* cited by examiner

FASCIA GUN

BACKGROUND OF THE INVENTION

1. Technical Field

The invention relates to a fascia gun.

2. Description of Related Art

Fascia guns can help professional athletes or part-time body builders massage large muscle groups, relax fasciae and release pains.

BRIEF SUMMARY OF THE INVENTION

Traditional fascia guns typically adopt mechanical switches to control their vibration frequency, which may cause inconvenience in use. For example, the traditional fascia guns cannot be easily operated with one hand.

The invention relates to a fascia gun which can overcome the technical defects of the prior art. The fascia gun is realized through the following technical solution:

The invention provides a fascia gun, comprising a shell, a massage head, a transmission mechanism, a driving device, and a control device, wherein the control device is connected to the driving device; the driving device is connected to the transmission mechanism; the transmission mechanism is connected to the massage head; the driving device, the transmission mechanism and the control device are all mounted in the shell; and the control device comprises a wireless transmission module to be connected to an upper computer. By adoption of this technical solution, compared with mechanical switch control, a wireless transmission function is provided, such that the vibration frequency of the fascia gun can be wirelessly controlled, thus greatly improving the ease of use of the fascia gun.

Further, the wireless transmission module is a Bluetooth module. By adoption of this technical solution, the wireless transmission module is a Bluetooth module, such that the vibration frequency of the fascia gun can be controlled by an instruction from a mobile phone APP, thus improving the ease of use of the fascia gun.

Further, the fascia gun is further provided with a speaker which is connected to the wireless transmission module through a circuit. By adoption of this technical solution, the speaker is connected to the wireless transmission module, such that the vibration frequency of the fascia gun can be controlled by audio, thus improving the ease of use of the fascia gun.

Further, the fascia gun further comprises a guiding and limiting device, the massage head comprises a connecting rod, the guiding and limiting device comprises a first sleeve and a second sleeve, a first through hole allowing the connecting rod to be inserted therein is formed in the center of the first sleeve, a plurality of connecting posts are disposed on the wall of a side, facing the shell, of the first sleeve, the diameter of the second sleeve is smaller than that of the first sleeve, the second sleeve is disposed in the first sleeve in a sleeved manner, a second through hole is formed in the center of the second sleeve, and a plurality of arc grooves are formed in the circumferential wall of a side, away from the massage head, of the second sleeve. By adoption of this technical solution, the fascia gun can be normally used for massage through the guiding and limiting device.

Further, the transmission mechanism comprises a transmission seat, a link and a slider, wherein a second connecting post is disposed on the transmission seat and is rotatably connected to a position, except a non-rotation center, of one end of the link, a hole is formed in the center of the second connecting post, a second connecting post is disposed at one end of the slider and is rotatably connected to the other end of the connecting rod, and the other end of the slider is movably connected to the second sleeve. By adoption of this technical solution, the motor of the fascia gun drives the transmission mechanism, which in turn drives the massage head to fulfill a massage effect.

Further, the driving device comprises a power source, a motor, a fixing frame, a base and rubber rings, wherein the power source is located below the motor and is fixed to the shell through the fixing frame, the power source is downwardly connected to the control device, one end of the motor is provided with a motor shaft inserted into the base and is connected to the transmission base, and the rubber rings are fixed to the periphery of the base. By adoption of this technical solution, the power source and the motor are normally connected to supply power to guarantee normal use of the fascia gun.

Further, the control device further comprises a first control panel and a second control panel, wherein the first control panel is connected to the wireless transmission module and is connected and provided with a nixie tube and a touch button, and the second control panel is connected to the power source. By adoption of this technical solution, the vibration frequency of the fascia gun can be controlled by touch, and a reading is observed by means of a nixie tube display screen.

Further, the shell comprises an upper shell, a lower shell and a mounting seat, wherein the upper shell is shaped like a semi-cylinder, an first arc mounting groove matched with the lower shell and used for mounting the lower shell is formed in a front end of the upper shell, a second arc mounting groove matched with the mounting seat and used for mounting the mounting seat is formed in a rear end of the upper shell, the lower shell is divided into an upper portion and a lower portion, the upper portion of the lower shell is shaped like a semi-cylinder, a circular ring is detachably or integrally disposed at a cylindrical front end of the lower shell, a seventh through hole allowing the slider to be inserted therein is formed in the center of the circular ring, and the lower portion of the lower shell is a cylindrical handle integrally connected to the upper portion of the lower shell, and an eighth through hole is formed in the upper portion of the lower shell. By adoption of this technical solution, all components of the fascia gun are disposed in the upper shell and the lower shell of the fascia gun, such that normal use of the fascia gun is guaranteed.

Further, first mounting posts matched with the lower shell are disposed at positions, close to a front end, of an inner wall of the upper shell, mounting posts matched with the first mounting posts upwardly extend from an inner wall of the upper portion of the lower shell, the speaker is disposed on the lower shell, a mounting groove for accommodating the speaker is disposed on the inner wall of the upper portion of the lower shell, third through holes are formed in four corners of the base, fourth connecting posts to be inserted into the third through holes upwardly extend out from an inner wall, around the eighth through hole, of the lower shell, rubber rings are disposed in the third through holes and are shaped like a hollow cylinder, grooves are formed in the middle of side walls of the cylinders, the rubber rings are fixed in the third through holes through the grooves, and the fourth connecting posts are inserted into the holes in the rubber rings. By adoption of the technical solution, all components of the fascia gun are disposed in the upper shell and the lower shell of the fascia gun, such that normal use of the fascia gun is guaranteed.

Further, the mounting seat comprises a display screen protection film, wherein the display screen protection film is mounted on an outer wall of the mounting seat, a ninth through hole for exposing the nixie tube and the touch button is formed in an outer wall of the mounting seat, a third arc mounting groove matched with the second arc mounting groove is formed in a rear end of the lower shell, the second arc mounting groove and the third arc mounting groove form a compete arc groove for clamping the mounting seat, and a first fixing post for fixing the Bluetooth module and a second fixing post for fixing the mounting seat are disposed on an inner wall of the rear end of the lower shell. By adoption of the technical solution, the vibration frequency of the fascia gun can be controlled according to an observed reading.

Compared with the prior art, the fascia gun provided by the embodiments of the application has the following beneficial effects: compared with mechanical switch control, a wireless transmission function is provided, such that the vibration frequency of the fascia gun can be wirelessly controlled, thus greatly improving the ease of use of the fascia gun.

To make the above and other objectives, features and advantages of the invention clearer and easy to understand, preferred embodiments are provided below to explain the invention in detail with reference to the accompanying drawings.

In the figures: 11, upper shell; 111, first arc mounting groove; 112, second arc mounting groove; 113, first mounting post; 12, lower shell; 121, eighth through hole; 122, fourth connecting post; 123, second mounting post; 124, mounting groove; 1251, seventh through hole; 126, first fixing post; 127, second fixing post; 128, third arc mounting groove; 13, massage head; 131, connecting rod; 14, mounting seat; 141, display screen protection film; 142, ninth through hole; 15, crank-link mechanism; 151, transmission seat; 1511, base; 1512, protrusion; 1513, second connecting post; 1514, first connecting hole; 1515, second connecting hole; 152, link; 1521, first mounting hole; 1522, second mounting hole; 153, slider; 1531, sixth through hole; 1532, connecting seat; 1533, third connecting post; 154, first bearing; 155, second bearing; 16, guiding and limiting device; 161, first sleeve; 1611, first through hole; 1612, connecting post; 162, second sleeve; 1621, second through hole; 1622, arc groove; 17, driving device; 171, power source; 172, motor; 173, fixing bracket; 174, base; 1741, third through hole; 1742, fourth through hole; 1743, fifth through hole; 175, rubber ring; 18, control device; 181, first control panel; 1811, nixie tube; 1812, touch button; 182, second control panel; 183, Bluetooth module; 184, bottom mounting cover; 19, speaker.

DETAILED DESCRIPTION OF THE INVENTION

To further expound the invention, the technical means adopted to fulfill desired purposes of the invention, and the effects of the invention, the specific implementations, structures, features and effects of the invention will be described in detail below in conjunction with the accompanying drawings and preferred embodiments.

Embodiments

Figure 1:
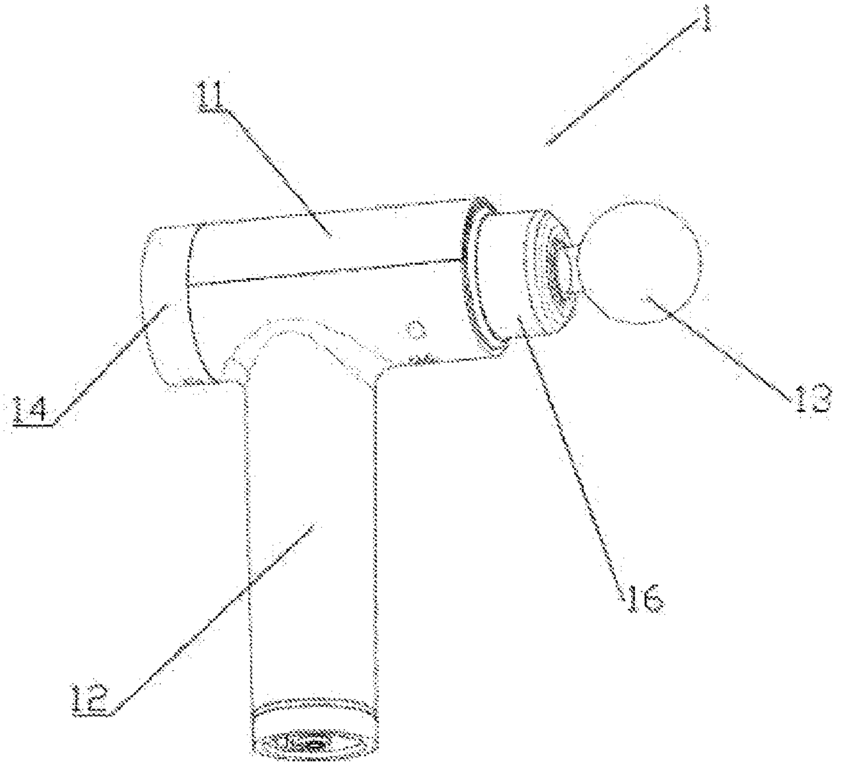
FIG. 1 is a schematic diagram of a fascia gun provided by Embodiment 1 of the invention.
Figure 2:
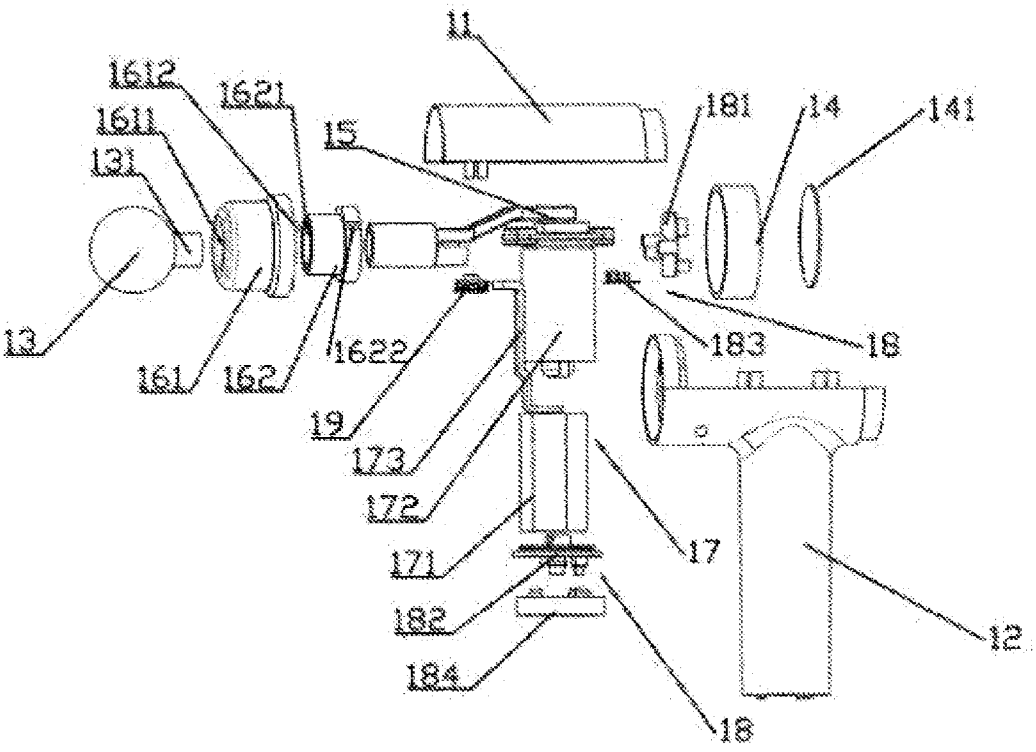
FIG. 2 is an exploded view of the fascia gun provided by FIG. 1.

As shown in FIG. 1 and FIG. 2, the invention provides a fascia gun. The fascia gun 1 comprises a shell, a massage head 13, a transmission mechanism 15, a guiding and limiting device 16, a driving device 17 and a control device 18, wherein the control device 18 is connected to the driving device 17; the driving device 17 is connected to the transmission mechanism 15; the transmission mechanism 15 is connected to the massage head 13; the driving device 17, the transmission mechanism 15 and the control device 18 are all mounted in the shell; the guiding and limiting mechanism 16 is mounted on the shell to guide and limit the transmission mechanism 15; and the transmission mechanism 15 is used for converting rotational motions of the driving device 17 into linear motions of the massage head 13. The control device 18 comprises a wireless transmission module for wirelessly transmitting control signals from an upper computer such as a mobile phone, a smart watch, a tablet computer or a notebook computer to control the rotation speed of the driving device 17 in the fascia gun, so as to control the moving frequency of the massage head 13. The wireless transmission module may be one of a Bluetooth module, a WIFI module, a GPRS module and a ZIGBEE module. In this embodiment, the wireless transmission module is preferably a Bluetooth module 183 with a data transmission function and an audio transmission function, and is used for transmitting both data signals and audio signals. The massage frequency of the fascia gun may be wirelessly controlled by the upper computer; or, audio signals may be transmitted by the upper computer. Music is played by a speaker in the fascia gun. Wherein, different control signals, such as sound control signals and touch control signals, may be from the upper computer.

Figure 3:
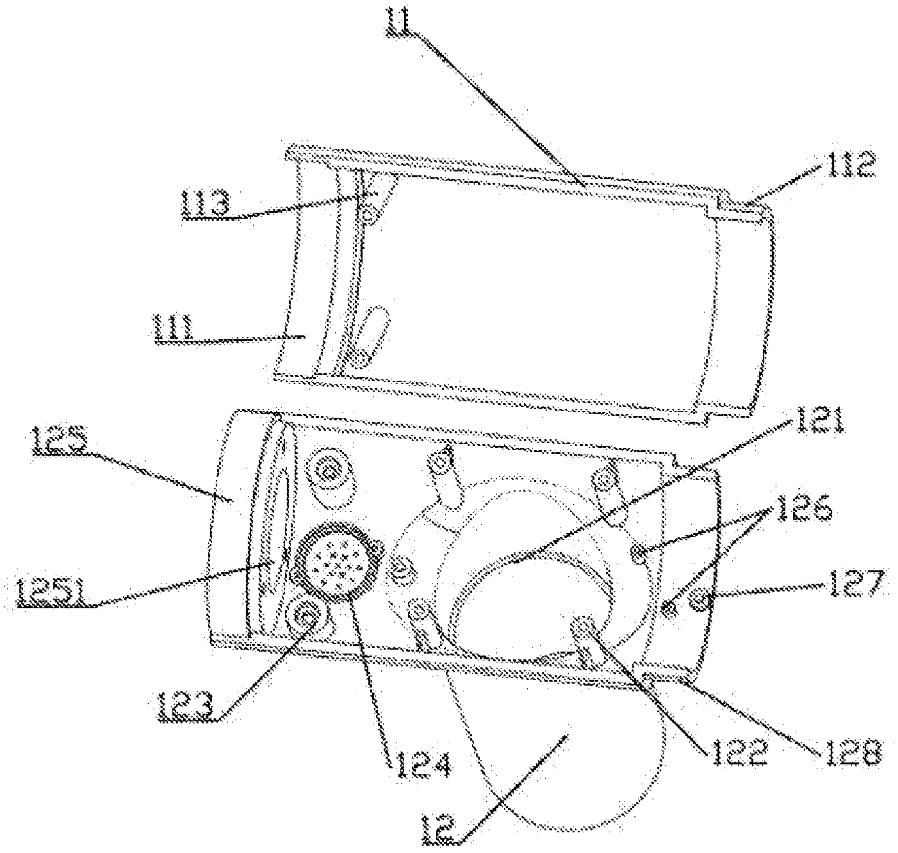
FIG. 3 is an internal structural view of an upper shell and a lower shell of the fascia gun provided by FIG. 1.

As shown in FIG. 2 and FIG. 3, the shell comprises an upper shell 11, a lower shell 12 and a mounting seat 14, wherein a speaker 19 is disposed in the upper shell 11 and the lower shell 12, the upper shell 11 is shaped like a semi-cylinder, an inner wall of a front end of the upper shell 11 is concaved outwardly to form a first arc mounting groove 111 matched with the lower shell 12, an outer side of a rear end of the upper shell 11 is concaved inwardly to form a second arc mounting groove 112, two first mounting posts 113 matched with the lower shell 12 extend downwards from the inner wall close to the front end of the upper shell 11, and threaded holes are formed in the center of the first mounting posts 113. An upper portion of the lower shell 12 is approximately shaped like a semi-cylinder, a lower portion connected to the upper portion of the shell 12 is shaped like a cylinder, a circular ring 125 is disposed at a front end of the upper portion of the lower shell 12 and is matched with and mounted in the first arc mounting groove 111 of the upper shell 11, a seventh through hole 1251 allowing the transmission mechanism 15 to be inserted therein is formed in the center of the circular ring 125 of the lower shell 12, two second mounting posts 123 connected to the first mounting posts 113 extend out upwardly from an inner wall of the lower shell 12, countersunk threaded holes are formed in the center of the second mounting posts 123, and a mounting groove 124 for accommodating the speaker 19 is formed between the two second mounting posts 123; an eighth through hole 121 for accommodating a motor 172 and a power source 171 is formed in a joint of the upper portion and the lower portion of the lower shell 12, and specifically, the lower portion of the lower shell is a cylindrical handle integrally connected to the upper portion of the lower shell 12, and forms the eighth through hole 121 together with the upper portion of the lower shell 12; four connecting posts 122 allowing rubber rings 175 to be inserted therein extend out upwardly from an inner wall, around the eighth through hole 121, of the lower shell, a first fixing post 126 and a second fixing post 127 for fixing the control device 18 are disposed at positions close to a rear end of the inner wall of the lower shell 12, the rear end of the lower shell 12 is concaved upwardly along an outer wall to form a third arc mounting groove 128, and when the upper shell 11 and the lower shell 12 are assembled, the second arc mounting groove 112 and the third arch mounting groove 128 from a complete arc groove for clamping the mounting seat 14.

As shown in FIG. 2, the massage head 13 is approximately spherical and is used for touch massage, a connecting rod 131 connected to the guiding and limiting device 16 is disposed on a spherical wall of the massage head 13. In other embodiments, the massage head 13 may be of different types according to product requirements.

As shown in FIG. 2, the guiding and limiting device 16 comprises a first sleeve 161 and a second sleeve 162, wherein the first sleeve 161 is cylindrical, a first through hole 1611 allowing the connecting rod 131 to be inserted therein is formed in the center of the first sleeve 161, a circular protrusion matched with the shell of the fascia gun extends outwards from a wall, away from the massage head 13, of the first sleeve 161, and three connecting posts 1612 matched with the shell of the fascia gun are disposed on the wall of a side, facing the shell of the fascia gun, of the protrusion; the second sleeve 162 is also cylindrical, the size of the first sleeve 161 is greater than that of the second sleeve 162, the second sleeve 162 is coaxially disposed in the first sleeve 161 in a sleeved manner, a second through hole 1621 allowing the transmission mechanism 15 to be inserted therein is formed in the center of the second sleeve 162, a circular protrusion extends outwardly from a wall of the side, away from the massage head 13, of the second sleeve 162, and three arc grooves 1622 matched with the connecting posts 1612 and allowing the connecting posts 1612 to be inserted therein are disposed at positions, corresponding to the connecting posts 1612, of the protrusion. The massage head 13 is inserted into the first through hole 1611 and the second through hole 1621 to be connected to the transmission mechanism 15.

Figure 4:
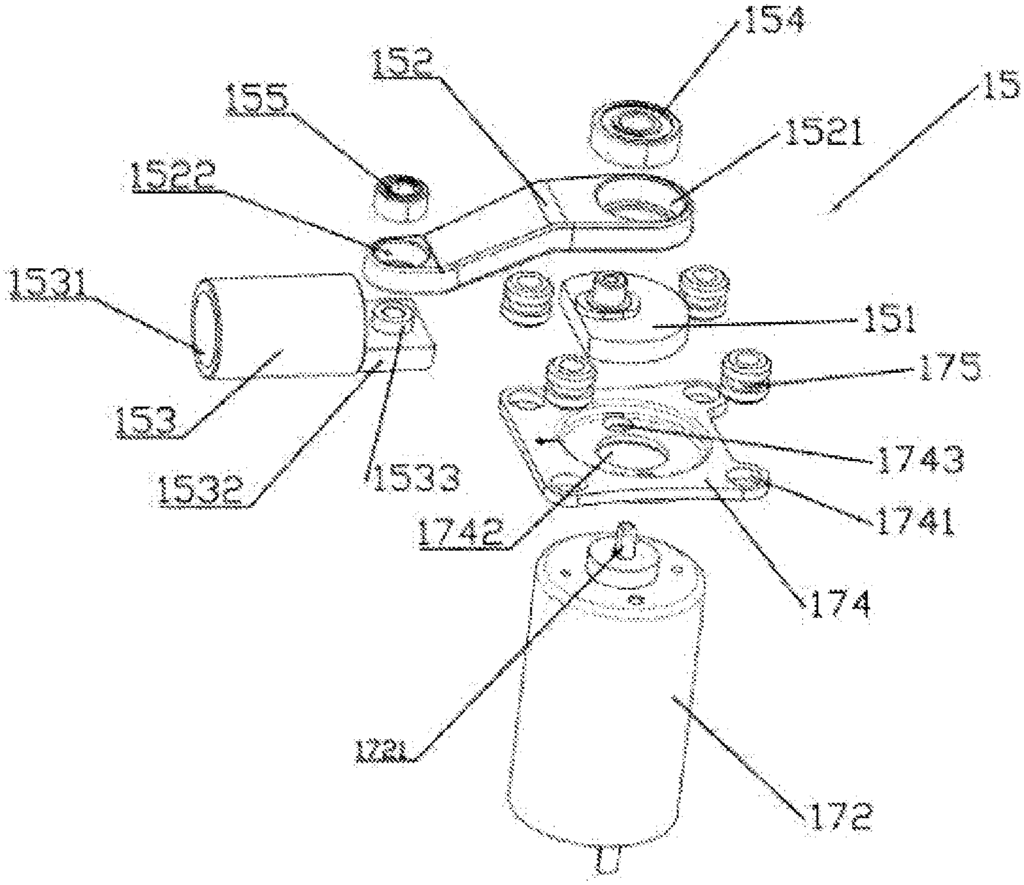
FIG. 4 is an exploded view of a crank-link mechanism provided by FIG. 2.
Figure 5:
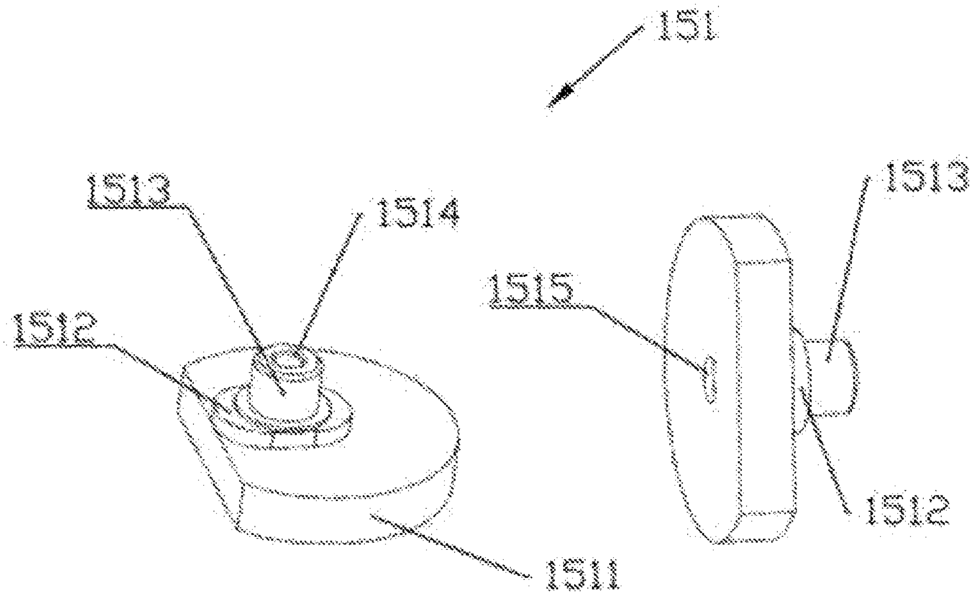
FIG. 5 is a partial enlarged view of crank-link mechanism provided by FIG. 4.

As shown in FIG. 2 to FIG. 4, the transmission mechanism 15 in this embodiment may be a crank-link mechanism and comprises a transmission seat 151, a link 152 and a slider 153, wherein the transmission seat 151 is mounted on a base 174 and comprises a base 1511 that is approximately in an arc shape, a protrusion 1512 protruding upwards is disposed on an upper surface of the base 1511, a second connecting hole 1513 connected to the driving device is disposed on a lower surface of the base 1511 and is formed in the rotation center of the transmission seat 151, a second connecting post 1513 connected to the link 152 is upwardly disposed at the center of the protrusion 1512, a first connecting hole 1514 is formed in the center of the second connecting post 1513, and the second connecting post 1513 in the transmission seat 151 is located at a position except the rotation center. The link 152 is disposed on an upper surface of the transmission seat 151, one end of the link 152 is connected to the transmission seat 151, and the other end of the link 152 is connected to the slider 153; a first mounting hole 1521 is formed in the end, connected to the transmission seat 151, of the link 152 and is used for accommodating a first bearing 154, such that the first bearing 154 is connected to the second connecting post 1513 of the transmission seat 151; a second mounting hole 1522 is formed in the end, connected to the slider 153, of the link 152 and is used for accommodating a second bearing 155, such that the second bearing 155 is connected to the slider 153. The slider 153 is approximately cylindrical, a sixth through hole 1531 allowing the connecting rod 131 of the massage head 13 to be inserted therein is formed in the wall of a side, connected to the massage head 13, of the slider 153, a semi-arc connecting seat 1532 extends outwardly from the other side of the slider 153, and a third connecting post 1533 allowing the second bearing 155 to be inserted therein is disposed at the center of an upper surface of the connecting seat 1532.

As shown in FIG. 2 and FIG. 4, the driving device 17 comprises a power source 171, a motor 172, a fixing bracket 173, a base 174 and rubber rings 175 which are all mounted in the lower shell 12, the power source 171 is located below the motor 172, is fixed on the shell through the fixing bracket 173 and is kept a certain distance away from the motor 172 to ensure that the power source 171 and the motor 172 can be used safely, the motor 172 is provided with a motor shaft 1721 connected into the second connecting hole 1515 in the rotation center of the transmission seat 151, and the control device 18 is connected below the power source 171. The base 174 is located above the motor 172 and is rectangular, third through holes 1741 for fixing the rubber rings 175 are formed in four corners of the base 174, the center of the base 174 is concaved downwardly to form a groove for mounting the transmission seat 151, a fourth through hole 1742 allowing the motor 172 to be inserted therein is formed in the center of the groove, and fifth through holes 1743 connected and fixed to the lower shell 12 are formed in the surfaces of two sides of the fourth through hole 1742. The rubber rings 175 are cylindrical and are used for reducing vibrations of the motors 172 with respect to the shell, holes matched with the fourth connecting posts 122 of the shell of the fascia gun are formed in the center of the rubber rings 175, and grooves matched with and used for fixing the base 174 are formed in the middle of circumferential walls of the rubber rings 175. In this embodiment, the power source is a storage battery. In other embodiments, the power source may be a plug-in power source.

Figure 6:
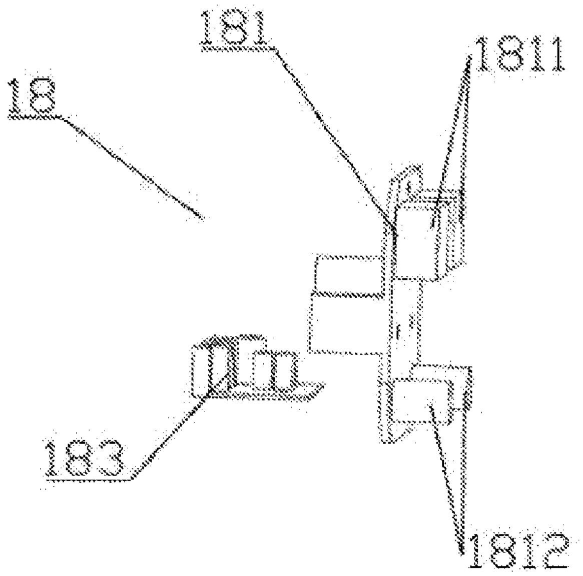
FIG. 6 is a structural view of a control device of the fascia gun provided by FIG. 2.

As shown in FIG. 2 and FIG. 6, the control device 18 further comprises a first control panel 181, a second control panel 182 and a bottom mounting cover 184, wherein the first control panel 181 is connected to the Bluetooth module 183 which is fixed in the lower shell 12 by means of the first fixing post 126, the first control panel 181 is fixed in the mounting seat 14 which is fixed to the lower shell 12 by means of the second fixing post 127, and is able to control the rotation speed of the motor 171 in the driving device, and a nixie tube 1811, a touch button 1812, a necessary resistor, capacitor and control chip, and the like are disposed on the first control panel 181. The second control panel 182 is connected to the first control panel 181, is also connected to the power source 171, and is able to control charging and discharging of the power source 171. The bottom mounting cover 184 is mounted at the bottom of the second control panel 182 and is provided with a power interface. In other embodiments, the touch button 1812 may be separately disposed outside the control device 18 and is connected to the control device through a circuit.

Figure 7:
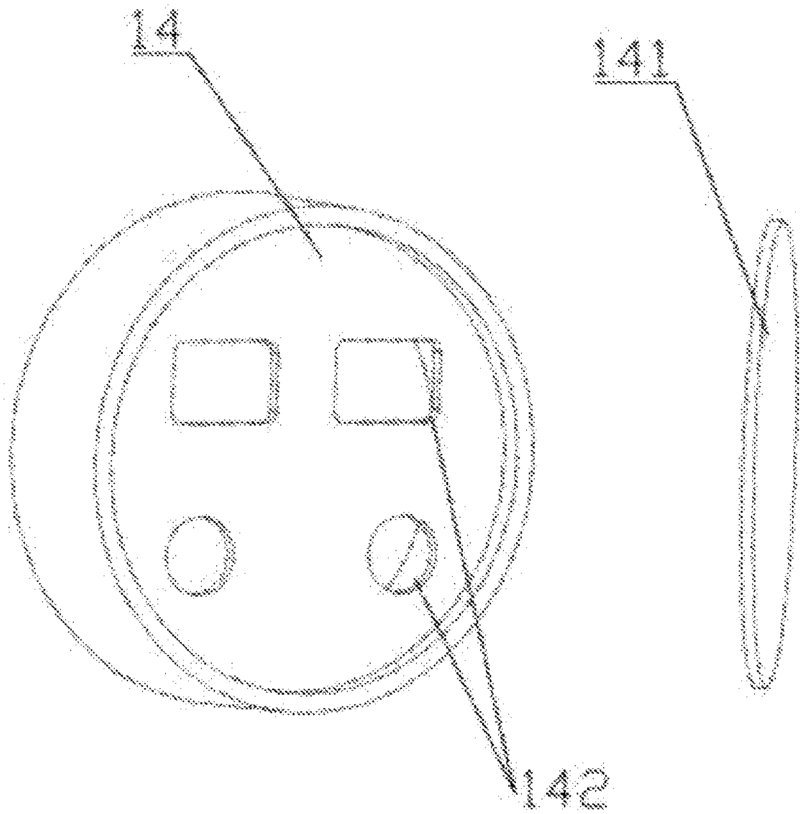
FIG. 7 is a structure view of a mounting seat of the fascia gun provided by FIG. 2.

As shown in FIG. 2 and FIG. 7, one end of the mounting seat 14 is shaped like a cylinder with one end being closed, the mounting seat 14 comprises a display screen protection film 141, a ninth through hole 142 for displaying a reading of the nixie tube 1811 and disposing the touch button 1812 is formed in the wall of the closed end of the mounting seat 14, and the display screen protection film 141 is disposed at the closed end of the mounting seat 14. The vibration frequency of the fascia gun 1 is controlled by means of an operating button of the display screen protection film 141.

When the fascia gun is used, the vibration frequency of the fascia gun is controlled by means of the display screen protection film 141 on the mounting seat 144 during touch control; the vibration frequency of the fascia gun is controlled by means of the Bluetooth module 183 during wireless control; and the speaker 19 may be controlled by Bluetooth to play music.

The above embodiments are merely preferred ones of the invention, and are not intended to limit the invention in any form. Although the invention has been disclosed above with reference to preferred embodiments, these preferred embodiments are not used to limit the invention, and any skilled in the field can make equivalent embodiments by slightly changing or modifying the technical contents disclosed above. Any simple amendments, equivalent variations and modifications made according to the technical essence of the invention without departing from the technical contents of the invention should still fall within the scope of the technical solution of the invention.

What is claimed is:

1. A fascia gun, comprising a shell, a massage head (13), a transmission mechanism (15), a driving device (17), and a control device (18), wherein the control device (18) is connected to the driving device (17); the driving device (17) is connected to the transmission mechanism (15); the transmission mechanism (15) is connected to the massage head (13); the driving device (17), the transmission mechanism (15) and the control device (18) are all mounted in the shell, and wherein the transmission mechanism (15) comprises a transmission seat (151), a link (152) and a slider (153), an upward second connecting post (1513) is disposed on the transmission seat (151) and is located at a position except a non-rotation center, a downward second connecting hole (1515) is formed in the transmission seat (151) and is located in the rotation center, the driving device (17) is connected to the second connecting hole (1515) of the transmission seat (151), a first mounting hole (1521) and a second mounting hole (1522) are formed in two ends of the link (152), the second connecting post (1513) is rotatably mounted in the first mounting hole (1521) in one end of the link (152), a third connecting post (1533) is disposed at an end of the slider (153) and is rotatably mounted in the second mounting hole (1522) in the other end of the link (152), and another end of the slider (153) is connected to the connecting rod (131) of the massage head (13).

2. The fascia gun according to claim 1, wherein the control device (18) comprises a wireless transmission module to be wirelessly connected to an upper computer, and the wireless transmission module is a Bluetooth module (183).

3. The fascia gun according to claim 2, wherein the fascia gun is further provided with a speaker (19) which is connected to the wireless transmission module through a circuit.

4. The fascia gun according to claim 3, wherein the fascia gun further comprises a guiding and limiting device (16), the massage head (13) comprises a connecting rod (131), the guiding and limiting device (16) comprises a first sleeve (161) and a second sleeve (162), a first through hole (1611) allowing the connecting rod (131) to be inserted therein is formed in a center of the first sleeve (161), a plurality of connecting posts (1612) are disposed on a wall of a side, facing the shell, of the first sleeve (161), a diameter of the second sleeve (162) is smaller than that of the first sleeve (161), the second sleeve (162) is disposed in the first sleeve (161) in a sleeved manner, a second through hole (1621) allowing the connecting rod (131) to be inserted therein is formed in a center of the second sleeve (162), and a plurality of arc grooves (1622) for accommodating the connecting posts (1612) are formed in a circumferential wall of a side, away from the massage head (13), of the second sleeve (162).

5. The fascia gun according to claim 2, wherein the fascia gun further comprises a guiding and limiting device (16), the massage head (13) comprises a connecting rod (131), the guiding and limiting device (16) comprises a first sleeve (161) and a second sleeve (162), a first through hole (1611) allowing the connecting rod (131) to be inserted therein is formed in a center of the first sleeve (161), a plurality of connecting posts (1612) are disposed on a wall of a side, facing the shell, of the first sleeve (161), a diameter of the second sleeve (162) is smaller than that of the first sleeve (161), the second sleeve (162) is disposed in the first sleeve (161) in a sleeved manner, a second through hole (1621) allowing the connecting rod (131) to be inserted therein is formed in a center of the second sleeve (162), and a plurality of arc grooves (1622) for accommodating the connecting posts (1612) are formed in a circumferential wall of a side, away from the massage head (13), of the second sleeve (162).

6. The fascia gun according to claim 1, wherein the fascia gun further comprises a guiding and limiting device (16), the massage head (13) comprises a connecting rod (131), the guiding and limiting device (16) comprises a first sleeve (161) and a second sleeve (162), a first through hole (1611) allowing the connecting rod (131) to be inserted therein is formed in a center of the first sleeve (161), a plurality of connecting posts (1612) are disposed on a wall of a side, facing the shell, of the first sleeve (161), a diameter of the second sleeve (162) is smaller than that of the first sleeve (161), the second sleeve (162) is disposed in the first sleeve (161) in a sleeved manner, a second through hole (1621) allowing the connecting rod (131) to be inserted therein is formed in a center of the second sleeve (162), and a plurality of arc grooves (1622) for accommodating the connecting posts (1612) are formed in a circumferential wall of a side, away from the massage head (13), of the second sleeve (162).

7. The fascia gun according to claim 1, wherein the driving device (17) comprises a power source (171), a motor (172), a fixing bracket (173) and a base (174), the power source (171) is located below the motor (172) and is connected to the motor through the fixing bracket (173), the power source (171) is downwardly connected to the control device (18), a fourth through hole (1742) is formed in a center of the base (174), the motor (172) is provided with a motor shaft (1721) with an end being inserted into the fourth through hole (1742), and the motor shaft (1721) is connected to the second connecting hole (1515) of the transmission seat (151).

8. The fascia gun according to claim 7, wherein the control device (18) further comprises a first control panel (181), and the first control panel (181) is connected and provided with a nixie tube (1811) and a touch button (1812).

9. The fascia gun according to claim 8, wherein the control device (18) further comprises a second control panel (182) connected to the power source (171).

10. The fascia gun according to claim 9, wherein the shell comprises an upper shell (11), a lower shell (12) and a mounting seat (14), the upper shell (11) is shaped like a semi-cylinder, an first arc mounting groove (111) matched with the lower shell (12) and used for mounting the lower shell (12) is formed in a front end of the upper shell (11), a second arc mounting groove (112) matched with the mounting seat (14) and used for mounting the mounting seat (14) is formed in a rear end of the upper shell (11), the lower shell (12) is divided into two portions, an upper portion of the lower shell (12) is shaped like a semi-cylinder, a circular ring (125) is detachably or integrally disposed at a cylindrical front end of the lower shell (12), a seventh through hole (1251) allowing the slider (153) to be inserted therein is formed in a center of the circular ring (125), and a lower portion of the lower shell (12) is a cylindrical handle integrally connected to the upper portion of the lower shell (12), and forms an eighth through hole (121) together with the upper portion of the lower shell (12).

11. The fascia gun according to claim 8, wherein the shell comprises an upper shell (11), a lower shell (12) and a mounting seat (14), the upper shell (11) is shaped like a semi-cylinder, an first arc mounting groove (111) matched with the lower shell (12) and used for mounting the lower shell (12) is formed in a front end of the upper shell (11), a second arc mounting groove (112) matched with the mounting seat (14) and used for mounting the mounting seat (14) is formed in a rear end of the upper shell (11), the lower shell (12) is divided into two portions, an upper portion of the lower shell (12) is shaped like a semi-cylinder, a circular ring (125) is detachably or integrally disposed at a cylindrical front end of the lower shell (12), a seventh through hole (1251) allowing the slider (153) to be inserted therein is formed in a center of the circular ring (125), and a lower portion of the lower shell (12) is a cylindrical handle integrally connected to the upper portion of the lower shell (12), and forms an eighth through hole (121) together with the upper portion of the lower shell (12).

12. The fascia gun according to claim 11, wherein first mounting posts (113) matched with the lower shell (12) are disposed at positions close to a front end of an inner wall of the upper shell (11), mounting posts (123) matched with the first mounting posts (113) upwardly extend from an inner wall of the upper portion of the lower shell (12), the speaker (19) is disposed on the lower shell (12), a mounting groove (124) for accommodating the speaker (19) is formed in the inner wall of the upper portion of the lower shell (12), third through holes (1741) are formed in four corners of the base (174), fourth connecting posts (122) to be inserted into the third through holes (1741) upwardly extend out from the inner wall, around the eighth through hole (121), of the lower shell (12), rubber rings (175) are disposed in the third through holes (1741) and are shaped like a hollow cylinder, grooves are formed in a middle of side walls of the cylinders, the rubber rings (175) are fixed in the third through holes (1741) through the grooves, and the fourth connecting posts (122) are inserted into the holes in the rubber rings (175).

13. The fascia gun according to claim 11, wherein the mounting seat (14) comprises a display screen protection film (141), the display screen protection film (141) is mounted on an outer wall of the mounting seat (14), a ninth through hole (142) for exposing the nixie tube (1811) and the touch button (1812) is formed in an outer wall of the mounting seat (14), a third arc mounting groove (128) matched with the second arc mounting groove (112) is formed in a rear end of the lower shell (12), the second arc mounting groove (112) and the third arc mounting groove (128) form a compete arc groove for clamping the mounting seat (14).

* * * * *